United States Patent [19]
Turowski

[11] 3,881,953

[45] May 6, 1975

[54] BATTERY ELECTRODE GRIDS AND METHOD OF MAKING SAME FROM A LEAD-CALCIUM-LITHIUM-TIN ALLOY

[75] Inventor: Lawrence Edward Turowski, New Kensington, Pa.

[73] Assignee: St. Joe Minerals Corporation, New York, N.Y.

[22] Filed: Nov. 26, 1973

[21] Appl. No.: 418,947

[52] U.S. Cl. .................. 136/26; 136/65; 75/166 D; 75/167
[51] Int. Cl. ........................................... H01m 35/02
[58] Field of Search ............ 136/65, 66, 35, 36, 26; 75/166 R, 166 D, 167, 135; 29/2

[56] References Cited
UNITED STATES PATENTS

| | | | |
|---|---|---|---|
| 1,628,050 | 5/1927 | Kraus et al. | 75/167 |
| 1,808,793 | 6/1931 | Shoemaker | 75/167 |
| 1,916,496 | 7/1933 | Shoemaker | 75/167 |
| 2,109,005 | 2/1938 | Bake | 75/167 |
| 2,272,181 | 2/1942 | Bouton | 75/167 |
| 3,287,165 | 11/1966 | Jensen | 136/65 |
| 3,647,545 | 3/1972 | Mao | 136/26 |

*Primary Examiner*—Anthony Skapars
*Attorney, Agent, or Firm*—Harold L. Stowell

[57] ABSTRACT

A battery electrode grid consists of a quaternary alloy consisting of about 0.05–0.70 percent lithium, 0.005–0.15 percent calcium, 0.1–2 percent tin, by weight and the balance lead.

3 Claims, No Drawings

BATTERY ELECTRODE GRIDS AND METHOD OF MAKING SAME FROM A LEAD-CALCIUM-LITHIUM-TIN ALLOY

BACKGROUND OF THE INVENTION

Due to its electrochemical and physical properties, lead is extensively used as a grid material in electrical storage batteries. However, since pure lead lacks sufficient strength to facilitate handling during processing and to support the active material during battery service, alloying elements are added to increase strength.

The most common prior art grid casting alloys contain antimony in amounts ranging from 3–12 percent by weight. The antimony renders the lead harder, stronger, markedly more creep-resistant, and more castable. These properties enable the antimonial alloys to perform well in areas ranging from grid casting and processing to actual battery service; thus, they have become the accepted industry standard.

In contrast to these beneficial aspects, antimony also produces certain undesirable side-effects during battery service. It increases the propensity to self-discharge, thus shortening battery life. Most importantly, the antimony lowers the hydrogen over-voltage and thus allows hydrogen to evolve during charging (i.e., gassing) which results in electrolyte losses. Consequently, water must be periodically added to maintain proper electrolyte level. This required maintenance can be expensive especially when numerous batteries are involved as in fleet operations and such batteries must be positioned in a readily accessible location. The direct labor costs can be substantial, plus, if the required maintenance is not performed, sizeable replacement costs can be incurred.

To reduce these maintenance costs, recent industry efforts have focused upon the development of non-antimonial grid alloys to be used in "maintenance-free" batteries. Lead-calcium and lead-calcium-tin alloys are presently being evaluated. They are comparable to antimonial alloys in terms of hardness and tensile strength, but research to date has shown that they do not perform as well as antimonial alloys under deep-cycling conditions such as those encountered in electric vehicle service.

Several theories have been advanced to account for the differences in cycling behavior between antimonial and existing non-antimonial alloys. It has been proposed that the much greater creep resistance of the antimonial alloys enables the grids to withstand the mechanical stresses produced by volume changes in the active material during charging and discharging. Another theory suggests that antimony migrates into the paste and strengthens it by altering paste morphology. A third theory suggests that the eutectic microstructure of antimonial alloys is responsible for the good cycling behavior in that it promotes the formation of a highly porous primary oxide layer on the grid metal. This porous oxide interfacial layer between the grid and active material can more readily accommodate the stresses produced by volume changes in the active material from the charge-discharge reaction.

OBJECTS OF THE INVENTION

It is an object of this invention to provide a castable battery grid alloy possessing favorable cycling behavior, high tensile strength, good creep resistance and microstructure and paste-altering properties resembling conventional antimonial battery grid alloys.

It is a further object to provide an electrode grid for a lead-acid battery cell that is essentially maintenance-free.

Another object is to provide a process for making grids for essentially maintenance-free lead-acid batteries.

DESCRIPTION OF THE INVENTION

One aspect of my invention includes the addition of specific proportions of lithium, calcium, and tin to lead to achieve mechanical and microstructural properties in grids cast therefrom in accordance with the aforementioned theories on cycling behavior. Lithium is added in amounts ranging from about 0.05 to 0.70 percent by weight, calcium in amounts ranging from 0.005 to 0.15 percent, tin in amounts of 0.1 to 2.0 percent by weight, with the balance lead.

The alloy of the invention is produced by adding the above-specified quantities of lithium, calcium, and tin to molten lead which is held at temperatures ranging from 700°–850°F. The alloyed melt can either be exposed to the natural atmosphere or it may be shielded to prevent alloying element burn-off, such shielding can be accomplished either with flux or inert gas covers. Suitable flux shields may comprise calcium chloride, or other alkaline earth metal chlorides. The melt is preferably cast into permanent grid producing molds pre-heated to about 450°F. The grids of the invention may also be cast using known drum-casting techniques and after casting the grids are air-cooled.

When prepared in this manner, the alloy of the invention is metallurgically superior to prior art lithium-containing grid alloys.

As hereinbefore set forth, such prior art lithium-containing grid alloys, though stronger than pure lead, possess undesirable characteristics which can ultimately hamper battery performance. Their major shortcoming is that they become brittle upon aging at room temperature, and those skilled in the art have attempted to overcome such shortcomings by the addition of tin to lead-lithium alloys as disclosed in, for example, U.S. Pat. No. 3,647,545-Mao. It has been found that the grids made from such alloys, while improved, still lack certain metallurgical properties which could adversely affect battery performance such as relatively low creep resistance. The present invention further improves the metallurgical properties of lead-lithium and lead-lithium-tin alloy grids and thus improves battery performance.

To effect these further improvements, small amounts of calcium are added to lead-lithium-tin alloy melts. The added calcium serves a twofold purpose. First, it reduces lithium oxidation from the melt due to its ability to form a tightly adherent surface film on lead melts. Secondly, the calcium helps to offset the strength reductions that normally occur in aged lead-lithium alloys. In fact, the residual calcium, in addition to offsetting strength reductions, actually was found to produce an unexpected degree of strengthening in aged grid samples.

The following table summarizes the improved strength of the new grid casting alloy in comparison to prior art lead-lithium and lead-lithium-tin alloys. All alloys were cast in the previously described manner and the castings were subsequently tested for ultimate tensile strength after aging at room temperature for the specified time intervals after casting.

| Alloy (Air-Cooled Samples) | UTS (psi) Time after Casting | | | | |
|---|---|---|---|---|---|
| % by Weight | ½ Hr. | 1 Day | 14 Days | 60 Days | 120 Days |
| Lead - 0.06% Li | 6064 | 5646 | 5065 | 3570 | 3075 |
| Lead - 0.06% Li-1% Sn | 6450 | 6700 | 5540 | 5475 | 5220 |
| Lead - 0.06% Li-1% Sn-0.065 Ca | 7530 | 8540 | 10095 | 10240 | 10245 |

As shown in the table, the improved grid alloy is stronger immediately after casting than the lead-lithium or lead-lithium-tin alloys. Also, it reaches and maintains much higher strengths than the prior art alloys without calcium additions upon aging at room temperature. The improved properties of the grid alloy of the invention are also evident when hardness, creep-resistance, or stress-rupture properties are compared. As described in the previously listed theory on the relationship between mechanical properties and cycling behavior, the superior mechanical properties of the alloy grids of the invention improve deep-cycling behavior of batteries constructed therefrom.

It has also been found that lithium is similar to antimony in its ability to migrate into the paste and strengthen it via morphological alterations. Therefore, its presence in the alloy of the invention improves cycling behavior. In terms of microstructure, the alloy possesses a fine-grained hypoeutectic structure similar to the antimonial alloys, and this type of cast microstructure provides for the formation of a porous oxide corrosion layer on the grid.

The improvements over prior art alloys in mechanical and microstructural properties directly result from maintaining the alloy's composition within the hereinbefore specified ranges, and in addition to the specific alloy set forth in the table, other particularly advantageous specific alloy compositions are:

Li  0.12% by weight
Ca  0.02% by weight
Sn  1.0 % by weight and the balance lead Li  0.08% by weight
Ca  0.03% by weight
Sn  1.0 % by weight and the balance lead Li  0.65% by weight
Ca  0.02% by weight
Sn  1.0 % by weight and the balance lead Li  0.14% by weight
Ca  0.04% by weight
Sn  2.0 % by weight and the balance lead Li  0.15% by weight
Ca  0.15% by weight
Sn  0.1 % by weight and the balance lead

I claim:

1. In a lead-acid battery cell, an electrode grid composed of an alloy of about 0.05 to 0.70 percent lithium by weight, calcium in the range of about 0.005 to 0.15 percent by weight, tin in the range of about 0.1 to 2 percent by weight, and the balance lead.

2. The invention, as described in claim 1, wherein said grid is composed of an alloy of about 0.12 percent lithium by weight, 0.02 percent calcium by weight, 1 percent tin by weight, and the balance lead.

3. A cast lead-acid battery grid composed of about 0.05 to 0.70 percent lithium by weight, about 0.005 to 0.15 percent calcium by weight, about 0.1 to 2 percent tin by weight and the balance lead.

* * * * *